(12) United States Patent
Arkin

(10) Patent No.: US 11,665,205 B2
(45) Date of Patent: *May 30, 2023

(54) LOCATION SERVICES ON A DATA EXCHANGE LAYER

(71) Applicant: Musarubra US LLC, Plano, TX (US)

(72) Inventor: Ofir Arkin, Petach Tikva (IL)

(73) Assignee: Musarubra US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,279

(22) Filed: Apr. 29, 2021

(65) Prior Publication Data

US 2021/0250382 A1     Aug. 12, 2021

Related U.S. Application Data

(63) Continuation of application No. 16/835,054, filed on Mar. 30, 2020, now Pat. No. 11,005,895, which is a
(Continued)

(51) Int. Cl.
*G06F 15/16* (2006.01)
*H04L 9/40* (2022.01)
(Continued)

(52) U.S. Cl.
CPC ........ *H04L 63/205* (2013.01); *G06F 13/4265* (2013.01); *H04L 63/0263* (2013.01);
(Continued)

(58) Field of Classification Search
CPC ............... H04L 63/205; H04L 63/0263; H04L 63/0281; H04L 63/1408; H04L 63/1425;
(Continued)

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

| CN | 101547424 A | 9/2009 |
| CN | 102137329 A | 7/2011 |

(Continued)

OTHER PUBLICATIONS

"Enabling Security Requirements for Enterprise Service-Oriented Architecture," Kalantari, Aleddin et al., Int. J. on Recent Trends in Engineering and Technology, vol. 6, No. 1, Nov. 21, 2011 (http://searchdl.org/public/journals/2011/IJRTET/6/1/243.pdf).
(Continued)

*Primary Examiner* — Duyen M Doan
(74) *Attorney, Agent, or Firm* — Patent Capital Group

(57) ABSTRACT

There is disclosed in one example a computing apparatus, including: a hardware platform including a processor and a memory; and instructions encoded within the memory to instruct the processor to: provide a data exchange layer (DXL) software interface, the DXL software interface to communicatively couple to an enterprise service bus (ESB) and to provide DXL messaging services via the ESB; communicatively couple to a DXL broker via the DXL software interface; via the DXL broker, subscribe to a DXL location services topic; receive via the DXL broker a location services query; and responsive the location services query, provide logical location data for one or more network devices.

20 Claims, 10 Drawing Sheets

Related U.S. Application Data continuation of application No. 14/913,101, filed as application No. PCT/US2014/057935 on Sep. 28, 2014, now Pat. No. 10,609,088.

(60) Provisional application No. 61/884,006, filed on Sep. 28, 2013.

(51) Int. Cl.
*H04L 67/51* (2022.01)
*H04L 67/52* (2022.01)
*G06F 13/42* (2006.01)

(52) U.S. Cl.
CPC ...... *H04L 63/0281* (2013.01); *H04L 63/1408* (2013.01); *H04L 63/1425* (2013.01); *H04L 63/1441* (2013.01); *H04L 63/20* (2013.01); *H04L 67/51* (2022.05); *H04L 67/52* (2022.05)

(58) Field of Classification Search
CPC ..... H04L 63/1441; H04L 63/20; H04L 67/16; H04L 67/18; G06F 13/4265
See application file for complete search history.

(56) References Cited

U.S. PATENT DOCUMENTS

| | | | |
|---|---|---|---|
| 6,460,050 | B1 | 10/2002 | Pace et al. |
| 7,506,155 | B1 | 3/2009 | Stewart et al. |
| 7,792,989 | B2 | 9/2010 | Toebes et al. |
| 7,814,226 | B2 | 10/2010 | Patrick |
| 8,015,604 | B1 | 9/2011 | Tidwell et al. |
| 8,201,257 | B1 | 6/2012 | Andres et al. |
| 9,027,120 | B1 | 5/2015 | Tidwell et al. |
| 9,038,125 | B2 | 5/2015 | Little |
| 9,811,849 | B2 | 11/2017 | Bursey |
| 2003/0105864 | A1* | 6/2003 | Mulligan ............... H04L 67/563 709/225 |
| 2005/0201299 | A1 | 9/2005 | Radi et al. |
| 2008/0069124 | A1 | 3/2008 | Patrick |
| 2008/0140759 | A1 | 6/2008 | Conner et al. |
| 2008/0147777 | A1 | 6/2008 | Azulai |
| 2008/0250097 | A1 | 10/2008 | Angelini et al. |
| 2008/0288330 | A1 | 11/2008 | Hildebrand et al. |
| 2009/0089078 | A1 | 4/2009 | Bursey |
| 2010/0057680 | A1* | 3/2010 | Little ...................... G06F 16/958 707/E17.014 |
| 2010/0057835 | A1 | 3/2010 | Little |
| 2010/0080148 | A1 | 4/2010 | Hulse et al. |
| 2010/0088326 | A1 | 4/2010 | Chen et al. |
| 2010/0130232 | A1* | 5/2010 | Dingler .................. H04L 67/18 455/456.3 |
| 2010/0192216 | A1 | 7/2010 | Komatsu |
| 2010/0251327 | A1 | 9/2010 | Channabasavaiah et al. |
| 2011/0088099 | A1 | 4/2011 | Villani et al. |
| 2011/0113105 | A1* | 5/2011 | Eckardt ................. G06Q 10/10 709/206 |
| 2011/0125821 | A1 | 5/2011 | Roshen |
| 2011/0154435 | A1 | 6/2011 | Fot et al. |
| 2011/0178942 | A1 | 7/2011 | Watters et al. |
| 2011/0213844 | A1 | 9/2011 | Pechanec et al. |
| 2011/0225650 | A1 | 9/2011 | Margolies et al. |
| 2011/0258637 | A1 | 10/2011 | Bezdicek et al. |
| 2011/0288692 | A1 | 11/2011 | Scott |
| 2011/0307789 | A1* | 12/2011 | Karenos ................. H04L 41/12 709/230 |
| 2012/0023576 | A1 | 1/2012 | Sorensen et al. |
| 2012/0210335 | A1 | 8/2012 | Salt et al. |
| 2012/0226789 | A1 | 9/2012 | Ganesan et al. |
| 2013/0055385 | A1 | 2/2013 | Antony et al. |
| 2013/0060825 | A1 | 3/2013 | Farcasiu et al. |
| 2013/0074143 | A1 | 3/2013 | Bu et al. |
| 2013/0205392 | A1 | 8/2013 | MacWan et al. |
| 2014/0007238 | A1 | 1/2014 | Magee et al. |
| 2014/0149599 | A1 | 5/2014 | Krishna et al. |
| 2014/0150060 | A1 | 5/2014 | Riley |
| 2015/0207809 | A1 | 7/2015 | Macaulay |
| 2016/0205143 | A1 | 7/2016 | Bryson et al. |
| 2016/0212228 | A1 | 7/2016 | Arkin |

FOREIGN PATENT DOCUMENTS

| | | |
|---|---|---|
| WO | 2008122887 A1 | 10/2008 |
| WO | 2015048598 A1 | 4/2015 |
| WO | 2015048599 A1 | 4/2015 |

OTHER PUBLICATIONS

"Security Patterns within a Service-Oriented Architecture," Hinton, Heather, et al., Nov. 31, 2005 (http://cdn.ttgtmedia.com/searchSOA/downloads/SecuritySOA_(2).pdf).

Chinese Office Action in Chinese Patent Application No. 201480047592.0 dated May 4, 2018, with Summary of Relevance, 12 pages.

Final Office Action in U.S. Appl. No. 14/913,101 dated Aug. 27, 2018, 18 pages.

International Preliminary Report on Patenatability in International Application No. PCT/US2014/057934 dated Mar. 29, 2016; 10 pages.

International Search Report and Written Opinion in International Application No. PCT/US2014/057934 dated Dec. 17, 2014.

International Search Report and Written Opinion in International Application PCT/US2012/057935 dated Jan. 12, 2015.

International Search Report on Patentability and Written Opinion in International Application PCT/US2012/057935 dated Mar. 29, 2016.

Non Final Office Action in U.S. Appl. No. 14/913,101 dated May 31, 2019, 13 pages.

Notice of Allowance in U.S. Appl. No. 14/913,101 dated Nov. 20, 2019, 9 pages.

USPTO Non-Final Office Action issued in U.S. Appl. No. 14/913,101 dated Dec. 29, 2017, 14 pages.

USPTO Non-Final Office Action issued in U.S. Appl. No. 14/912,540 dated Jul. 13, 2017; 35 pages.

USPTO Notice of Allowance issued in U.S. Appl. No. 14/912,540 dated Nov. 24, 2017; 31 pages.

* cited by examiner

LOCATION SERVICES ON A DATA EXCHANGE LAYER

CROSS-REFERENCE TO RELATED APPLICATIONS

This application is a continuation of U.S. patent application Ser. No. 16/835,054, filed Mar. 30, 2020, titled "LOCATION SERVICES ON A DATA EXCHANGE LAYER," which is a continuation of U.S. patent application Ser. No. 14/913,101, filed Feb. 19, 2016, titled "LOCATION SERVICES ON A DATA EXCHANGE LAYER," and issued as U.S. Pat. No. 10,609,088, which claims priority to U.S. Provisional Application 61/884,006, filed 28 Sep. 2013, titled "SECURITY-CONNECTED PLATFORM," which is incorporated by reference in its entirety. Co-pending PCT Application PCT/US2013/076570, titled "Context-Aware Network on a Data Exchange Layer," filed Dec. 19, 2013, is also incorporated herein by reference.

Co-pending PCT Application Serial No. PCT/US2014/057934, filed on Sep. 28, 2014 and entitled "SECURITY-CONNECTED FRAMEWORK" is also incorporated herein by reference.

FIELD OF THE DISCLOSURE

This application relates to the field of enterprise security, and more particularly to a security-connected framework for a data exchange layer.

BACKGROUND

An enterprise service bus (ESB) is a software-based network architecture that provides a medium of data exchange over a service-oriented architecture. In some embodiments, ESB is a special case of a client-server software architecture in which clients may route messages through the server.

Software, binaries, executables, advertising, web pages, documents, macros, executable objects, and other data provided to users (collectively "executable objects") may include security flaws and privacy leaks that are subject to exploitation by malware. As used throughout this Specification, malicious software ("malware") may include a virus, Trojan, zombie, rootkit, backdoor, worm, spyware, adware, ransomware, dialer, payload, malicious browser helper object, cookie, logger, or similar application or part of an application designed to take a potentially-unwanted action, including by way of non-limiting example, data destruction, covert data collection, covert communication, browser hijacking, network proxy hijacking or redirection, covert tracking, data logging, keylogging, excessive or deliberate barriers to removal, contact harvesting, unwanted use of premium services, and unauthorized self-propagation. In some cases, malware may also include legitimate software that includes inadvertent security flaws that cause or enable malware behavior. "Malware behavior" is defined as any behavior that qualifies an application as malware or grayware. Some existing systems are configured to identify and block malware, for example by maintaining databases of known malware.

In addition to executable objects, computing devices may encounter static objects, which are not intended to change the operating state of a computer. As a class, executable objects and static objects may be referred to simply as "objects." An enterprise security concern is the classification of objects' malware status.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
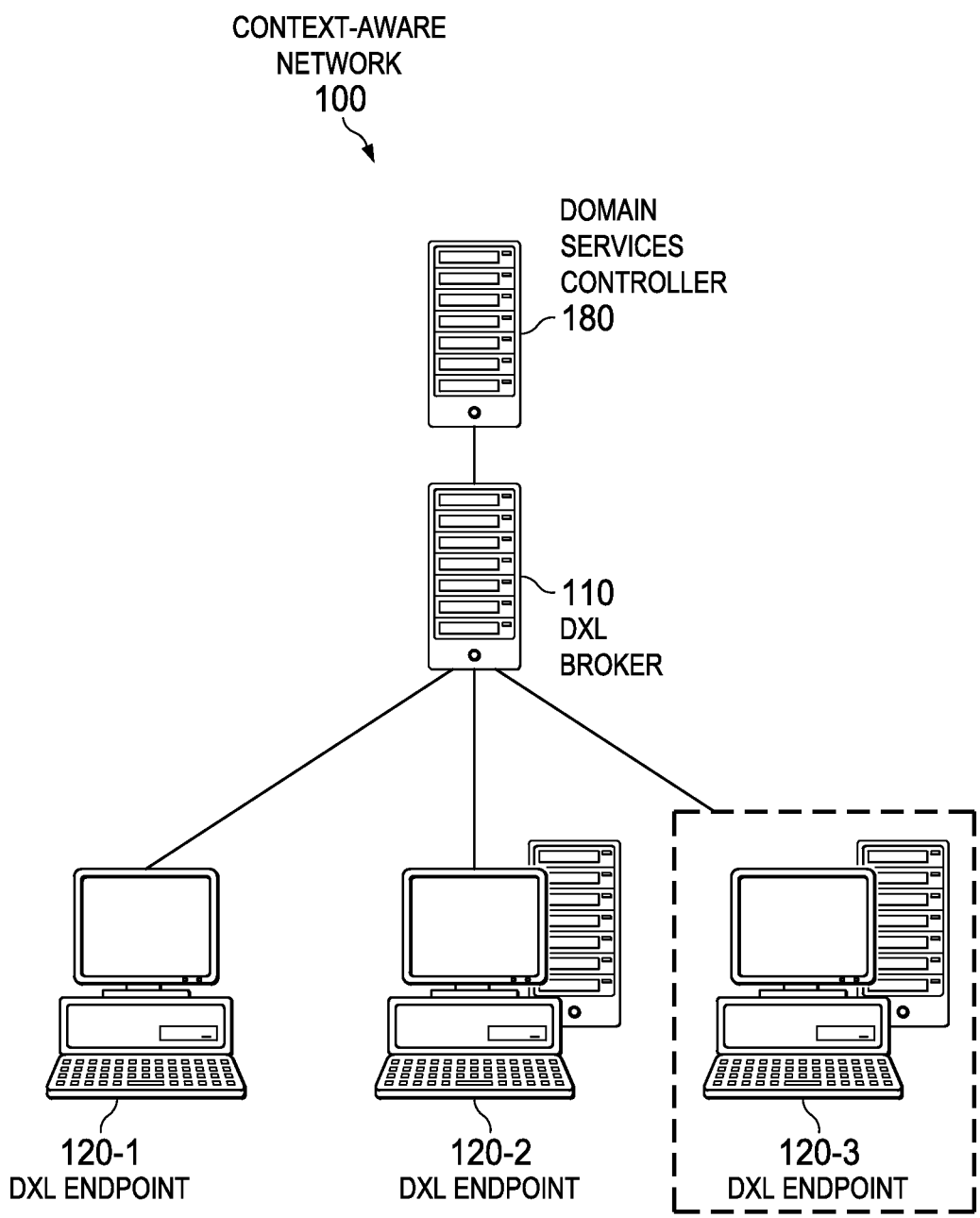
FIG. 1 is a block diagram of a context-aware network according to one or more examples of the present Specification.

In an example, there is disclosed a computing apparatus, comprising: a hardware platform comprising a processor and a memory; and instructions encoded within the memory to instruct the processor to: provide a data exchange layer (DXL) software interface, the DXL software interface to communicatively couple to an enterprise service bus (ESB) and to provide DXL messaging services via the ESB; communicatively couple to a DXL broker via the DXL software interface; via the DXL broker, subscribe to a DXL location services topic; receive via the DXL broker a location services query; and responsive the location services query, provide logical location data for one or more network devices.

EXAMPLE EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In an example, the present Specification provides a data exchange layer (DXL), which may operate on a lightweight messaging-based communications infrastructure such as ESB and be configured to allow endpoints to share contextual data. The DXL is built on top of messaging technology, such as an ESB, which enables multiple different use cases and capabilities (context-aware and adaptive security by sharing context between multiple different products allowing for security components to operate as one to immediately share relevant data between endpoint, gateway, and other security products enabling security intelligence and adaptive security (facilitating immediate changes in behavior according to information received); superior command and control of endpoints and many other use cases).

DXL messaging enables a real-time, bi-directional communications infrastructure allowing products and solutions to integrate with each other using a single application programming interface (API). Each device may share essentially any data it likes over the DXL fabric, while the devices themselves are only loosely coupled, and need not operate on common or standardized protocols.

Examples of DXL message types include publish-subscribe notifications, query-response, and push notification. Devices may also share events, including security-related events, contextual information (about the node, the identity of its user, the applications used, the location for which they are found, etc.), commands, tasks, and policies, by way of non-limiting example.

In one example, client devices may variously be classified as either "producers" or "consumers" of messages, wherein producers provide relevant security messages, and consumers receive those messages. A device's role as either a producer or consumer need not be static, and in general any device can be either a producer or a consumer, depending on context. A device's role as producer or consumer may also change over time or circumstances. Thus, one device may be both a producer and consumer of certain message topics; a second device may be a producer for some topics but not for other topics; a third device may be a consumer for certain topics and a producer for other topics.

As long as clients are subscribed to one or more topics (wherein each topic includes a different class or species of message) a communication path exists to the consumers. Connection initiation is performed by clients.

As used throughout this Specification, a "DXL message" includes any message communicated over a DXL ESB. Each DXL message includes at least one "topic" representing a subject or classification of the message. Topics may include threat intelligence, context, and events by way of non-limiting example.

By design, each DXL endpoint is configured to subscribe to at least one DXL message topic (at a minimum, a private destination topic for routing DXL messages to that DXL endpoint). This enables bi-directional communications over the DXL, between a management platform, for example, and one or more of its managed clients.

In an example of a security-connected framework, a real-time, bi-directional communications fabric is provided for enabling real-time security management. Specifically, certain existing messaging infrastructures are based on one-to-many communications (publish-subscribe). The publish-subscribe capabilities may be significantly enhanced, so that communication can be one-to-one (for example, peer-to-peer), or bi-directional (for example, query-response). Advantageously, the framework can scale to millions of concurrent connected clients, so that any connected client can reach any other connected client in real-time or near real-time regardless of the physical location of the connected clients. To this end, the DXL abstraction layer is provided between different types of connected clients, and acts as an intermediary communications medium.

A DXL domain master may combine and reconcile the client properties received from a plurality of sources into a single record of truth according to a common information model (CIM), containing a single value or values. This may include determining that a first data source is more trusted than a second data source, and using the data from the first data source, or otherwise reconciling a plurality of data into a single record.

The reconciled data may be stored in a domain database, and a domain master may publish the client properties on the DXL. A DXL broker may then forward the published message to DXL endpoints, which receives a singular and most accurate reconciled value. Subsequently, a client may send a DXL request over the DXL, inquiring about the properties of a DXL client. The DXL broker receives this request and automatically routes it to a domain master. The domain master retrieves the client properties from its domain database and sends a DXL response message, which the DXL broker receives and forwards to the DXL client. Note that while the "publish-subscribe" transactions in this example are one-to-many, one-to-one "request-response" transactions are natively provided on the same fabric.

Further adding to extensibility, new or better data sources may be incorporated, by integrating them with domain master 160. This may be completely transparent to clients 120 and other DXL endpoints.

Additional features of a DXL broker may include, by way of non-limiting example: service and location registries to lookup registered endpoints, available services, and their locations; publish/subscribe (1:N), request/response (1:1), device-to-device (1:1), and push notification messaging interfaces; optimized message passing between brokers; destination-aware message routing; and broker-to-broker failover.

Advantageously, domain masters need not be concerned with how each DXL endpoint treats a published message. Rather, that can be a matter of enterprise security policy.

Figure 2:
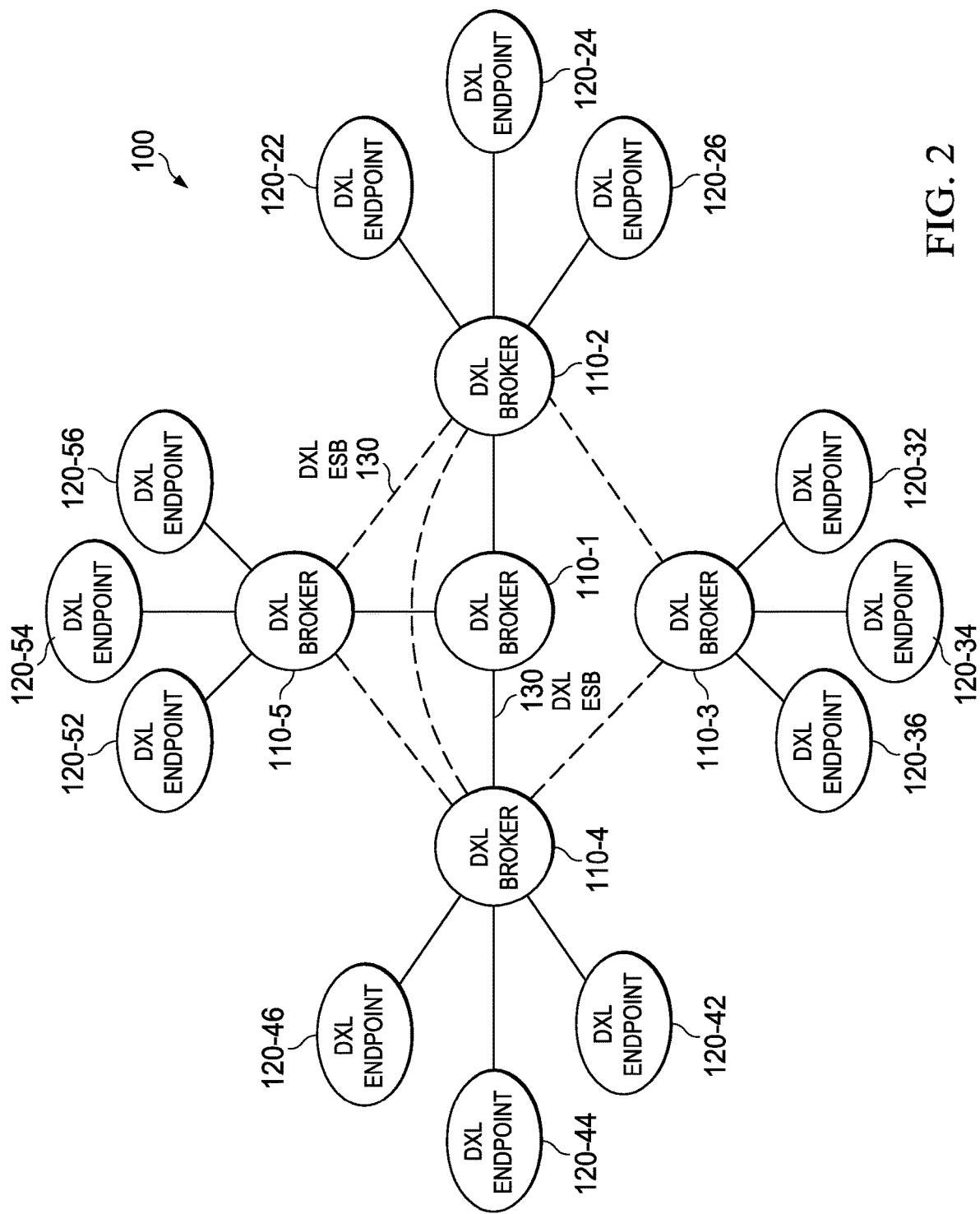
FIG. 2 is a block diagram of a data exchange layer according to one or more examples of the present Specification.

FIG. 1 is a network-level block diagram of a context-aware network 100 with DXL capability. According to this example, a plurality of DXL endpoints 120 is connected to a DXL enterprise service bus (ESB) 130 (FIG. 2). DXL ESB 130 is an example of a DXL fabric, and may be provided on top of an existing network, such as a local area network (LAN). DXL ESB 130 need not be a particular physical bus, or even reside on a physical network. Rather, DXL ESB 130 may span multiple physical networks and subnetworks. Conceptually, DXL ESB 130 is simply the "fabric" over which DXL endpoints 120 share DXL messages, wherein each DXL message includes a topic, and only DXL endpoints 120 that subscribe to that topic receive and/or act on messages for that topic.

DXL endpoint 120 may be any suitable computing device. In the example of FIG. 1, DXL endpoints are generically represented as computing devices. In one example, DXL endpoint 120-1 may be an embedded device, such as a network security sensor. DXL endpoint 120-2 may be a virtual machine. DXL endpoint 120-3 may be a laptop or notebook computer. It should also be noted that DXL endpoints are not limited to end-user or client devices.

Domain services controller (DSC) 180 may be considered a special case of a DXL endpoints 120. Other network elements may include a domain master, a joint threat intelligence (JTI) server, default gateway, proxy, and threat intelligence service. Any network element may join DXL ESB 130 as a DXL endpoint.

Network elements configured to operate on or with DXL ESB 130 may be referred to as "DXL endpoints." These may include, in an example, DXL endpoints 120, and DXL broker 110.

DXL broker 110 may be configured to provide DXL messaging services over DXL ESB 130, such as maintaining DXL routing tables and delivering messages.

DSC 180 may be configured to provide domain services, such as auxiliary and support services, antivirus services, and/or command and control services. In one particular example, DSC 180 may include an asset management engine and/or physical network topology engine, which may be configured to logically and physically map and track network assets as described herein. Additionally, or in another example, DSC 180 may include security management software (SMS), which may provide network command and control functions.

In an example, DXL endpoints connect to DXL ESB 130. Each DXL endpoint is assigned a distinct identity, and authenticates itself to DXL ESB 130 upon startup, for example via a certificate or other secure token. DXL endpoints may establish one-to-one communications via DXL ESB 130, for example by sending a DXL message addressed to a DXL endpoint with a specific identity. This enables DXL endpoints to communicate with each other without having to establish a point-to-point network connection. In an example, this is analogous to a person-to-person phone call.

In another example, DXL may provide a publish-subscribe framework in which certain DXL endpoints "subscribe" to messages of a certain type. When a DXL endpoint "publishes" a message of that type on DXL ESB 130, all subscribers may process the message, while non-subscribers may safely ignore it. In an example, this is analogous to a podcast subscription service. In yet another example, DXL may provide a request-response framework.

FIG. 2 is a network diagram disclosing a DXL ESB 130 on a context aware network 100 according to one or more examples of the present Specification. In this example, DXL broker 110-1 may be designated as the "hub," while DXL brokers 110-2, 110-3, 110-4, and 110-5 may be designated as "spokes." In an example, all DXL traffic that passes through a spoke will be forwarded to the hub, which will distribute the traffic to other spokes. Designation of a DXL broker 110 as the hub may be accomplished via any suitable means, such as selecting the hub based on MAC ID, IP address, or network proximity to a domain master.

If DXL broker 110-1 goes offline, another hub may be at least temporarily needed. In that case, another hub may be elected. When DXL broker 110-1 comes back online, it may resume its duties as a hub, or may act as a spoke, depending on network topology and design considerations.

In another example, spokes may form a temporary mesh network upon connecting effectively to DXL broker 110-1. In yet other embodiments, DXL brokers 110 may be configured to operate full time in a mesh configuration.

Additional extensibility may be provided by bridging DXL ESB 130 across disparate networks, enabling data to be exchanged over larger networks, including the Internet.

DXL brokers 110 may be configured to enhance the efficiency of DXL ESB 130. For example, each DXL broker 110 may maintain a list of subscribed topics for each connected DXL endpoint 120. The DXL broker 110 then itself subscribes to those topics. Each DXL broker 110 also maintains a list of which topics each other DXL broker 110 subscribes to. When a DXL broker 110 receives a message from any of its DXL endpoints 120, the DXL broker 110 determines which other brokers are subscribed to the topic of the DXL message, and forwards the message only to those brokers.

Figure 3:
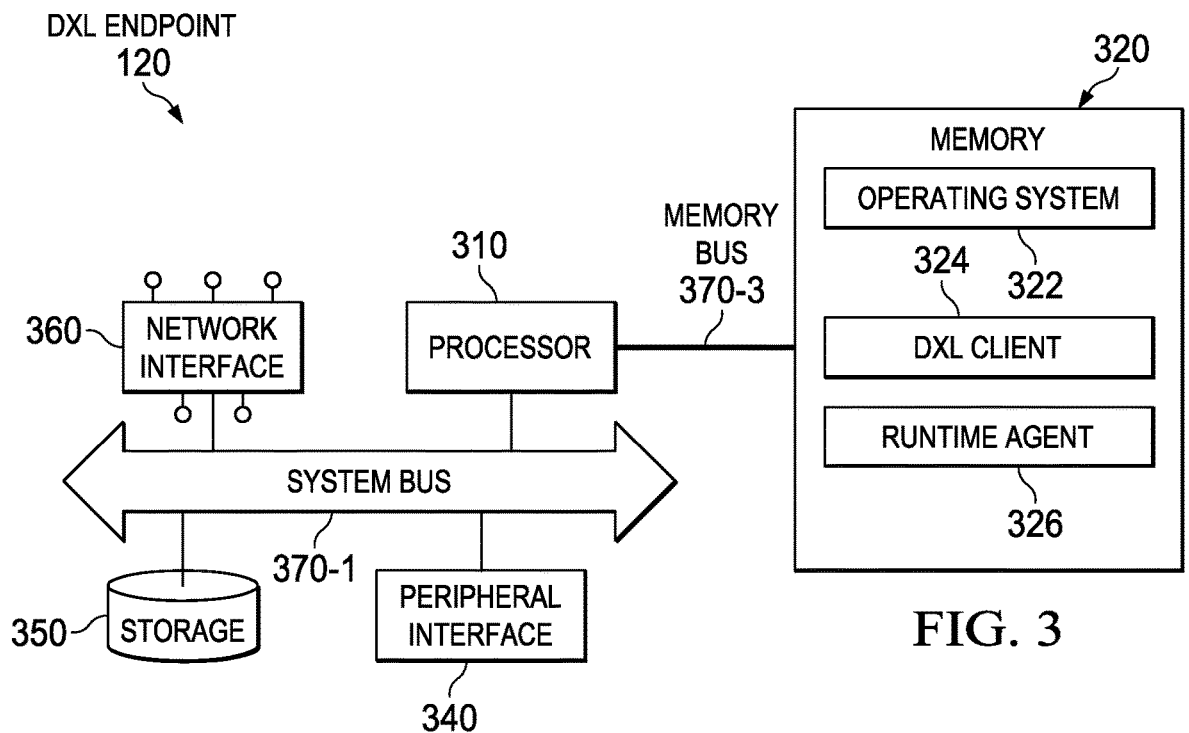
FIG. 3 is a block diagram of a DXL endpoint according to one or more examples of the present Specification.

FIG. 3 is a block diagram of client device 120 according to one or more examples of the present Specification. Client device 120 may be any suitable computing device. In various embodiments, a "computing device" may be or comprise, by way of non-limiting example, a computer, embedded computer, embedded controller, embedded sensor, personal digital assistant (PDA), laptop computer, cellular telephone, IP telephone, smart phone, tablet computer, convertible tablet computer, handheld calculator, or any other electronic, microelectronic, or microelectromechanical device for processing and communicating data.

Client device 120 includes a processor 310 connected to a memory 320, having stored therein executable instructions for providing an operating system 322 and DXL client 324. Other components of client device 120 include a storage 350, network interface 360, and peripheral interface 340.

In an example, processor 310 is communicatively coupled to memory 320 via memory bus 370-3, which may be for example a direct memory access (DMA) bus by way of example, though other memory architectures are possible, including ones in which memory 320 communicates with processor 310 via system bus 370-1 or some other bus. Processor 310 may be communicatively coupled to other devices via a system bus 370-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of hardware, software, or firmware providing programmable logic, including by way of non-limiting example a microprocessor, digital signal processor, field-programmable gate array, programmable logic array, application-specific integrated circuit, or virtual machine processor.

Processor 310 may be connected to memory 320 in a DMA configuration via DMA bus 370-3. To simplify this disclosure, memory 320 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 320 may comprise a relatively low-latency volatile main memory, while storage 350 may comprise a relatively higher-latency non-volatile memory. However, memory 320 and storage 350 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 350 may be any species of memory 320, or may be a separate device, such as a hard drive, solid-state drive, external storage, redundant array of independent disks (RAID), network-attached storage, optical storage, tape drive, backup system, cloud storage, or any combination of the foregoing. Storage 350 may be, or may include therein, a database or databases or data stored in other configurations, and may include a stored copy of operational software such as operating system 322 and software portions of DXL client 324. Many other configurations are also possible, and are intended to be encompassed within the broad scope of this Specification.

Network interface 360 may be provided to communicatively couple client device 120 to a wired or wireless network. A "network," as used throughout this Specification, may include any communicative platform operable to exchange data or information within or between computing devices, including by way of non-limiting example, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Network interface 360 may be configured to communicatively couple client device 120 to a DXL broker 110.

DXL client 324 and runtime agent 326 are examples of "engines." As used throughout this Specification, an "engine" includes one or more logic elements, including hardware, software, and/or firmware, configured to perform or operable for performing the function of the engine. An engine may be self-contained on a single device, or may span multiple devices. Furthermore, a single device may include a plurality of engines. For ease of discussion, the engines disclosed herein are shown, by way of example only, as a software subroutine running from memory. In one example, an engine is a utility or program that provides its host device with the necessary APIs and interfaces for performing a particular function. An engine may be, in other examples, embodied in hardware, software, firmware, or some combination thereof. For example, in some cases, an engine may include a special integrated circuit designed to carry out a method or a part thereof, and may also include software instructions operable to instruct a processor to perform the method. In some cases, the engine may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In other examples, an engine may include other hardware and software, including interactive or user-mode software, which may be provided in conjunction with, in addition to, or instead of the engine to perform methods according to this Specification.

In one example, an engine comprises executable instructions stored on a non-transitory computer-readable medium operable, when executed, for performing the methods of the engine. At an appropriate time, such as upon booting the host device, or upon a command from an operating system or a user, the processor may retrieve from storage a copy of the engine and load it into memory. The processor may then iteratively execute the instructions of the engine.

Peripheral interface 340 may be configured to interface with any auxiliary device that connects to client device 120 but that is not necessarily a part of the core architecture of client device 120. A peripheral may be operable to provide extended functionality to client device 120, and may or may not be wholly dependent on client device 120. In some cases, a peripheral may be a computing device in its own right. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

Figure 4:
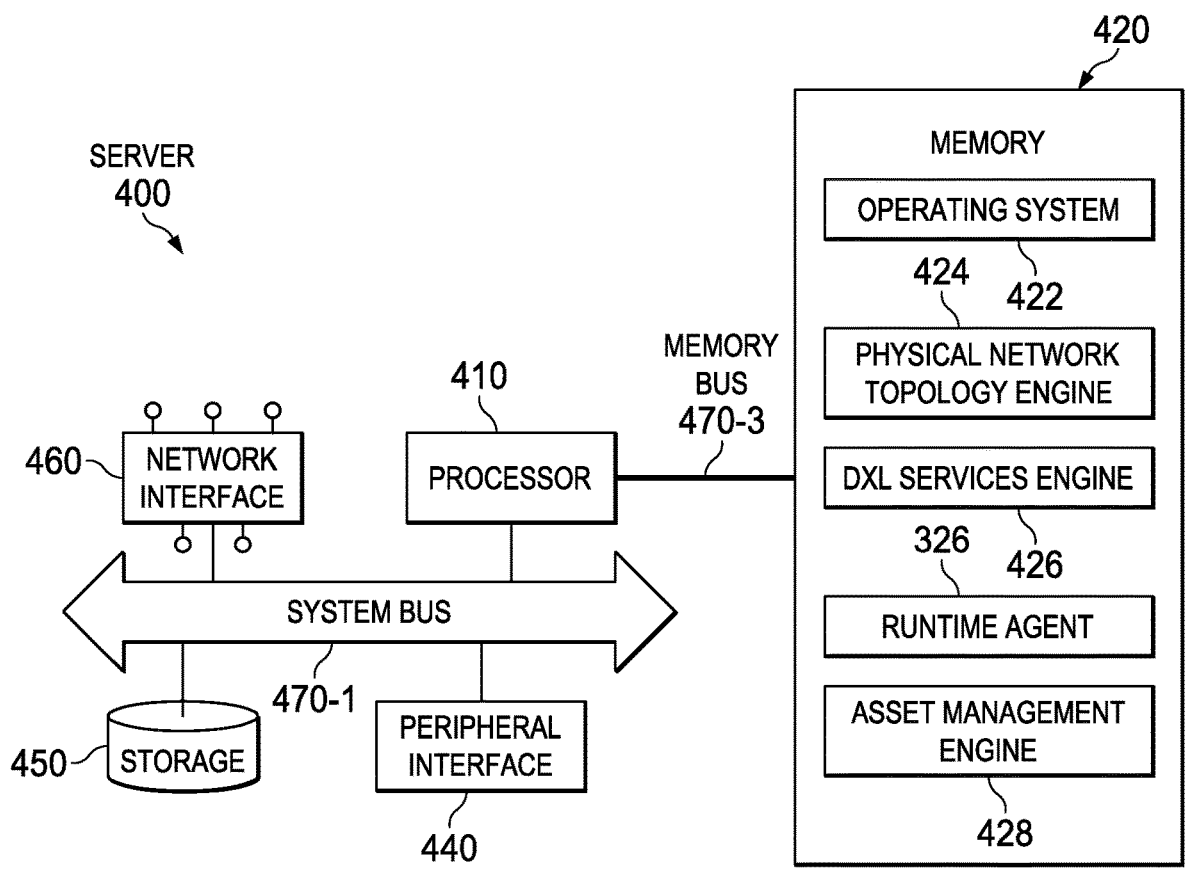
FIG. 4 is a block diagram of a server according to one or more examples of the present Specification.

FIG. 4 is a block diagram of a server 400 according to one or more examples of the present Specification. Server 400 may be any suitable computing device, as described in connection with FIG. 3. In general, the definitions and examples of FIG. 3 may be considered as equally applicable to FIG. 3, unless specifically stated otherwise. However, a server 400 may usefully and conceptually be used to refer to a class of computing devices that provide server functions in client-server architectures. Thus, in certain embodiments, DSC 180, DXL broker 110, and other devices described herein may all be various embodiments of servers 400. They are discussed here together for purposes of clarity, and because servers 400 may share many common elements. However, it should be particularly noted that a number of "engines" are described herein. Each engine may include one or more hardware, software, and/or firmware logic elements configured to provide server functions. The number of server engines, and which server engines to include, are determined by the server's function.

Server 400 includes a processor 410 connected to a memory 420, having stored therein executable instructions for providing an operating system 422, and one or more of a physical network topology engine 424, a runtime agent 326, and an asset management engine 428. Other components of server 400 include a storage 450, network interface 460, and peripheral interface 440.

In an example, processor 410 is communicatively coupled to memory 420 via memory bus 470-3, which may be for example a direct memory access (DMA) bus. Processor 410 may be communicatively coupled to other devices via a system bus 470-1.

Processor 410 may be connected to memory 420 in a DMA configuration via DMA bus 470-3.

Storage 450 may be any species of memory 420, or may be a separate device, as described in connection with storage 350 of FIG. 3. Storage 450 may be, or may include therein, a database or databases or data stored in other configurations, and may include a stored copy of operational software such as operating system 422 and software portions of physical network topology engine 424, DXL services engine 426, runtime agent 326, and asset management engine 428. Many other configurations are also possible, and are intended to be encompassed within the broad scope of this Specification.

Network interface 460 may be provided to communicatively couple server 400 to a wired or wireless network.

Physical network topology engine 424, DXL services engine 426, runtime agent 326, and asset management engine 428 are embodiments of engines, as described in FIG. 3 above.

Asset management engine 428 and physical network topology engine 424 may carry out methods as described in FIGS. 6-11 below. In one example, asset management engine 428 includes or interfaces with a McAfee® Asset Manager (MAM). In some cases, asset management engine 428 may also provide location services, as described in more detail in connection with FIGS. 6-11.

Peripheral interface 440 may be configured to interface with any auxiliary device that connects to server 400 but that is not necessarily a part of the core architecture of server 400. A peripheral may be operable to provide extended functionality to server 400, and may or may not be wholly dependent on server 400. In some cases, a peripheral may be a computing device in its own right. Peripherals may include, by way of non-limiting examples, any of the devices discussed in connection with peripheral interface 340 of FIG. 3.

Figure 5:
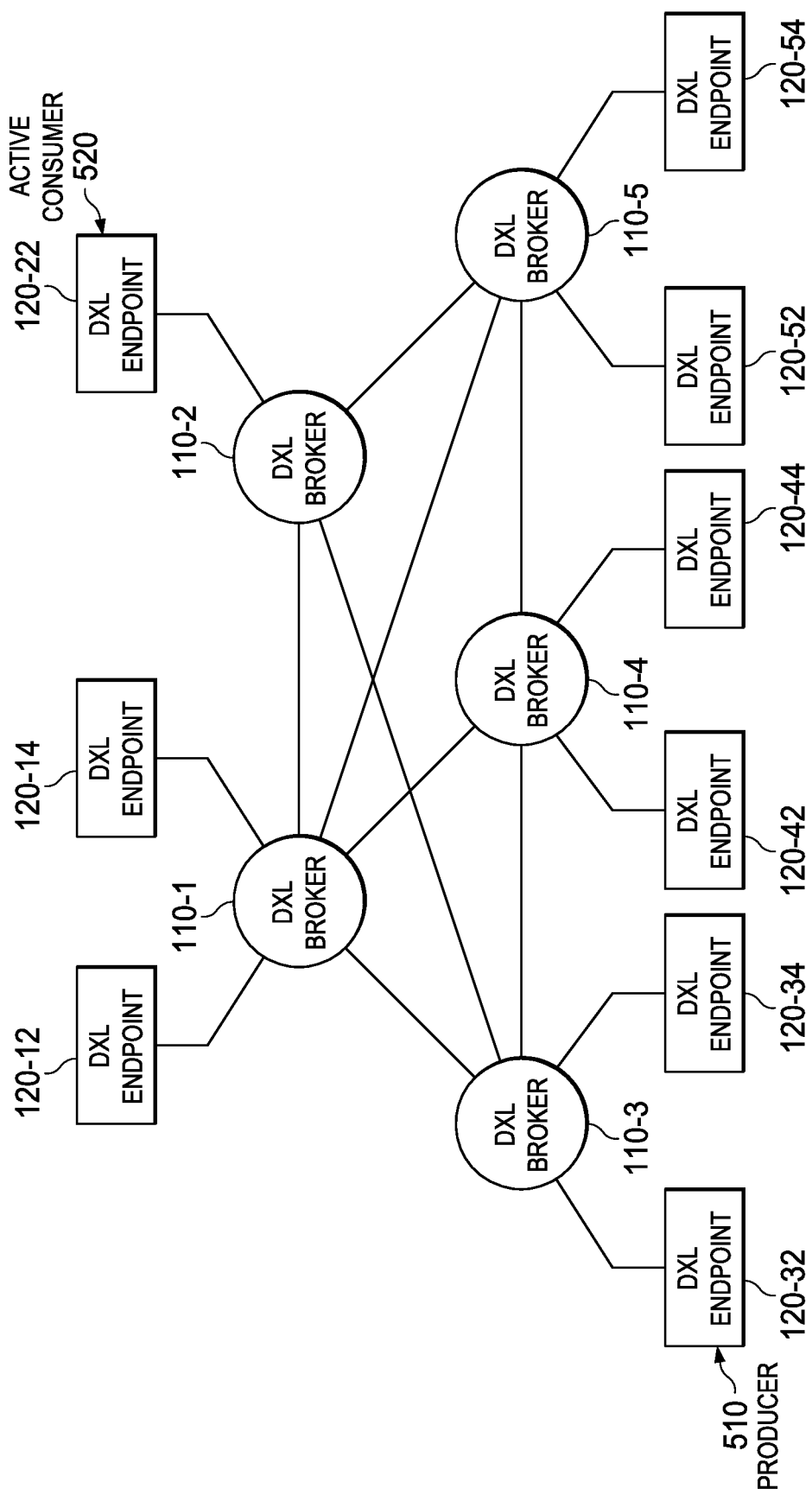
FIG. 5 is a block diagram of a producer-consumer architecture according to one or more examples of the present Specification.

FIG. 5 is a network-level block diagram of a data exchange layer according to one or more examples of the present Specification. In the example of FIG. 5, five DXL brokers 110 provide services to DXL endpoints 120.

Specifically, DXL endpoints 120-12 and 120-14 are connected to DXL broker 110-1. DXL endpoints 120-32 and 120-34 are connected to DXL broker 110-3. DXL endpoints 120-42 and 120-44 are connected to DXL broker 110-4. DXL endpoints 120-52 and 120-54 are connected to DXL broker 110-5. DXL endpoint 120-22 is connected to DXL broker 110-2.

FIGS. 6-11 provide an example of location services provided by the security-connected framework of the present Specification.

As used in this Specification, a "logical location" includes a collection of one or more interconnected routers and/or switches, a collection of one or more IP subnets, or other topologies, which may map to one or more geo-locations. For example, an enterprise network may include a plurality of geographical locations. A single enterprise network may include devices spread across a large variety of geo-locations. In one example, an enterprise includes offices and/or data centers in Santa Clara, Calif.; Plano, Tex.; Bangalore, India; Tel Aviv, Israel; and Tokyo, Japan. In this case, there may be a need for a DXL device in Tel Aviv to communicate with a DXL device in Plano.

Location context may play a role in such transactions, and is part of a broader collection of situational and environmental information that plays a unique role in satisfying multiple use cases. These include, by way of non-limiting example:

Gathering complete understanding of the true scope and size of an organization (in this example, spanning from Santa Clara westward to Tokyo).

Dividing geo-locations and network locations into a plurality of security zones.

Ensuring completeness of an operation.

Detecting network locations a security appliance does not protect and/or cover (e.g. IP subnets or devices that do not include a runtime security agent).

Supporting location-dependent product configurations.

Resolving situations where conflicting IP addressing exists.

Providing network-based services according to geographical or logical location (e.g. providing location-based services).

Enabling products operating in the same geo-location to form a collaboration.

In certain embodiments, properly representing a location requires, at a minimum, acquiring a list of all routers operating at the location along with the following information per router:

An interface list, including the configuration of each interface.

A routing table.

A content-addressable memory (CAM) table, including media access control (MAC) address-to-virtual local area network (VLAN) mapping, and port-of-arrival mapping. The CAM table may also include address resolution protocol (ARP) information, which maps MAC addresses to IP addresses.

With this information, DSC 180 can compile a list of all IP subnets in use at a location, and can verify that the list of routers is indeed part of the same location.

Because there may be conflicting IP address allocations within the same network, representing an IP subnet by its IP address will not necessarily uniquely identify one subnet from another. An alternative method of identifying subnets is to correlate the subnet's IP address to the MAC address of the router interface set as the default gateway for the IP subnet. This coupling creates a unique identifier that resolves the conflicting IP addressing representation issue. For example:

MAC Address$(x)_{Router(z)}$::IP Subnet$(y)$ Where MAC Address$(x) \in$ Router$(z)$ Common configurations may include the following:

A router's interface may serve as the default gateway for multiple IP subnets

A router may be configured using multiple interfaces acting as default gateways for multiple different IP subnets Multiple routers may operate in the same location An IP subnet may be defined in-between two or more routers In one example of the present Specification, a logical location is specified as follows:

Location =
{
  (MAC Address$(1)_{Router(1)}$ : : IP Subnet (1 ... n) ... MAC Address$(n)_{Router(1)}$ : : IP Subnet (n)) ∪
  (MAC Address$(1)_{Router(z)}$ : : IP Subnet (1) ... MAC Address$(n)_{Router(z)}$ : : IP Subnet (n)) ∪
  (MAC Address$(x)_{Router(1)}$, MAC Address$(y)_{Router(k)}$, ... MAC Address$(z)_{Router(z)}$ : : IP Subnet ( j ) )
}

Figure 6:
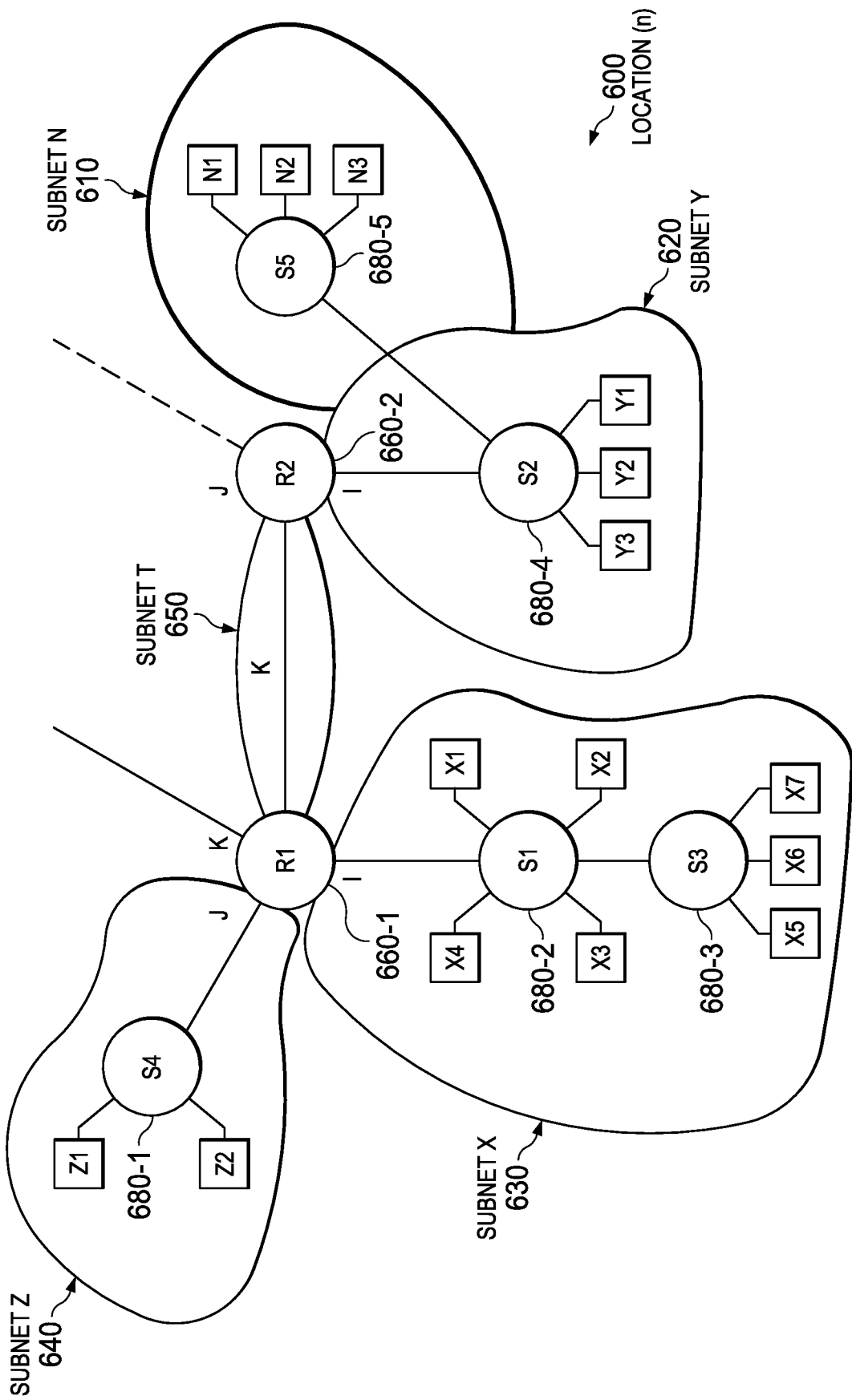
FIG. 6 is a block diagram of a logical network map according to one or more examples of the present Specification.

FIG. 6 is a network diagram of a location (n) 600 according to one or more examples of the present Specification. Location (n) 600 includes five subnets, namely subnet N 610, subnet Y 620, subnet X 630, subnet Z 640, and subnet T 650.

In this example, routers $R_1$ and $R_2$ may be configured to act as default gateways to their respective subnets.

Router $R_1$ provides multiple interfaces (j, k, i), serving as the default gateways for IP subnets X, Z, and T respectively.

Switch $S_4$ interfaces with router $R_1$ on interface $R_{1j}$ and controls subnet Z, including endpoints $Z_1$ and $Z_2$.

Switches $S_1$ and $S_3$ control subnet X. Switch $S_1$ connects to router $R_1$ on interface $R_{1i}$. Subnet X includes endpoints $X_1$, $X_2$, $X_3$, and $X_4$ connect to switch $S_1$. Endpoints $X_5$, $X_6$, and $X_7$ connect to switch $S_3$, which also interfaces to switch $S_1$.

Subnet T is logically defined on interface $R_{1k}$. No endpoints exist on this subnet. However, router $R_2$ is communicatively coupled to router $R_1$ on interface $R_{2k}$.

Router $R_2$ also includes logical interfaces i and k, connecting to subnets Y and T respectively. Connection $R_{2j}$ is not defined or configured in this FIGURE.

Subnet Y includes switch $S_2$, which communicatively couples to interface $R_{2i}$. Endpoints $Y_1$, $Y_2$, and $Y_3$ are communicatively coupled to switch $S_2$.

Switch $S_2$ also communicatively couples to subnet N via switch $S_5$. Note that in this example, subnet N does not have a direct or single-hop link to either router $R_1$ or $R_2$ on any logical interface.

Non-limiting examples of conditions on this network include:

Two interconnected routers, namely $R_1$ and $R_2$.

Interface $R_{2j}$ services both subnet Y and IP subnet N.

Interfaces $R_{1k}$ and $R_{2k}$ share a single subnet, namely subnet T.

Location (n) may therefore be represented as follows:

```
Location (n) =
{
MAC Address (R_1i) : : IP Subnet (X),
MAC Address (R_1j) : : IP Subnet (Z),
MAC Address (R_2i) : : IP Subnet (Y),
MAC Address (R_2j) : : IP Subnet (N),
(MAC Address (R_1k), MAC Address (R_2k) ) : : IP Subnet (T)
}
```

A runtime agent 324 may be configured in each device to collect and report relevant information. In some cases, a plugin may be provided to runtime agent 324 for collecting such information. Information gathered from runtime agents 324 running on a plurality of devices may enable an enterprise to create a comprehensive and accurate list of all IP subnets in the enterprise. An enterprise security administrator can then manually map IP subnets to geo-locations.

Advantageously, this addresses some inherent difficulties in mapping IP subnets to geo-locations, including:

Many-sometimes thousands or more-IP subnets may be used within a network. This makes manual mapping difficult.

Manually associating IP subnets to geo-locations can be error prone.

A strong understanding of the network topology cannot be assumed because poor understanding of the network topology may be the very problem that needs to be addressed by mapping Distinguishing between internal IP subnets to external IP subnets requires detailed knowledge of the IT infrastructure and the physical topology of the network.

Thus, in some cases, automated mapping may be preferable to manual mapping, particularly for large enterprises. In one example, a network device uses the SNMP protocol to remotely interrogate all routers and/or switches to determine the connectivity relationship that exists between networking devices operating in the same location building a mapping of all locations part of a network.

An asset management engine 428 may be used to build and maintain the physical network topology of a network. The output provided by asset management engine 428 is a list of discovered locations, and their physical network topology disclosing the connectivity relationship between routers and switches operating in the same location (e.g., layer-2 and layer-3 connectivity information). In one example, the output provided by asset management engine 428 marks the borders between internal to external locations.

Asset management engine 428 may include a physical network topology engine to discover and maintain the logical location of a device, the IP address of the switch, and the port a device is connected to. These data may be provided for each authorized device operating on DXL ESB 130. Asset management engine 428 may gather information in real-time or near real-time as a device joins the network. This enables asset management engine 428 to continuously maintain an accurate view of the physical network topology of the network.

In some cases, the virtual map that asset management engine 428 builds may not align perfectly with the actual physical network topology, particularly when some devices do not include a runtime agent 324 or when routers cannot be queried. In that case, manual mapping may be used to correlate and align the virtual map to the actual map.

When distributed applications provide multiple service instances (such as multiple policy orchestration servers, multiple security information and event management (SIEM) receivers that collect logs from different parts of the network). There is a need to map between the different service instances (one or many), per distributed application, and the location(s) each instance is to serve. One use case is automatic configuration of services per a device's location, in which case asset management engine 428 holds the relevant information.

In one example, mapping between locations and services is a manual process wherein a user associates a location with one or more instances of different services. Asset management engine 428 may provide an appropriate graphical user interface for performing this function.

Figure 7:
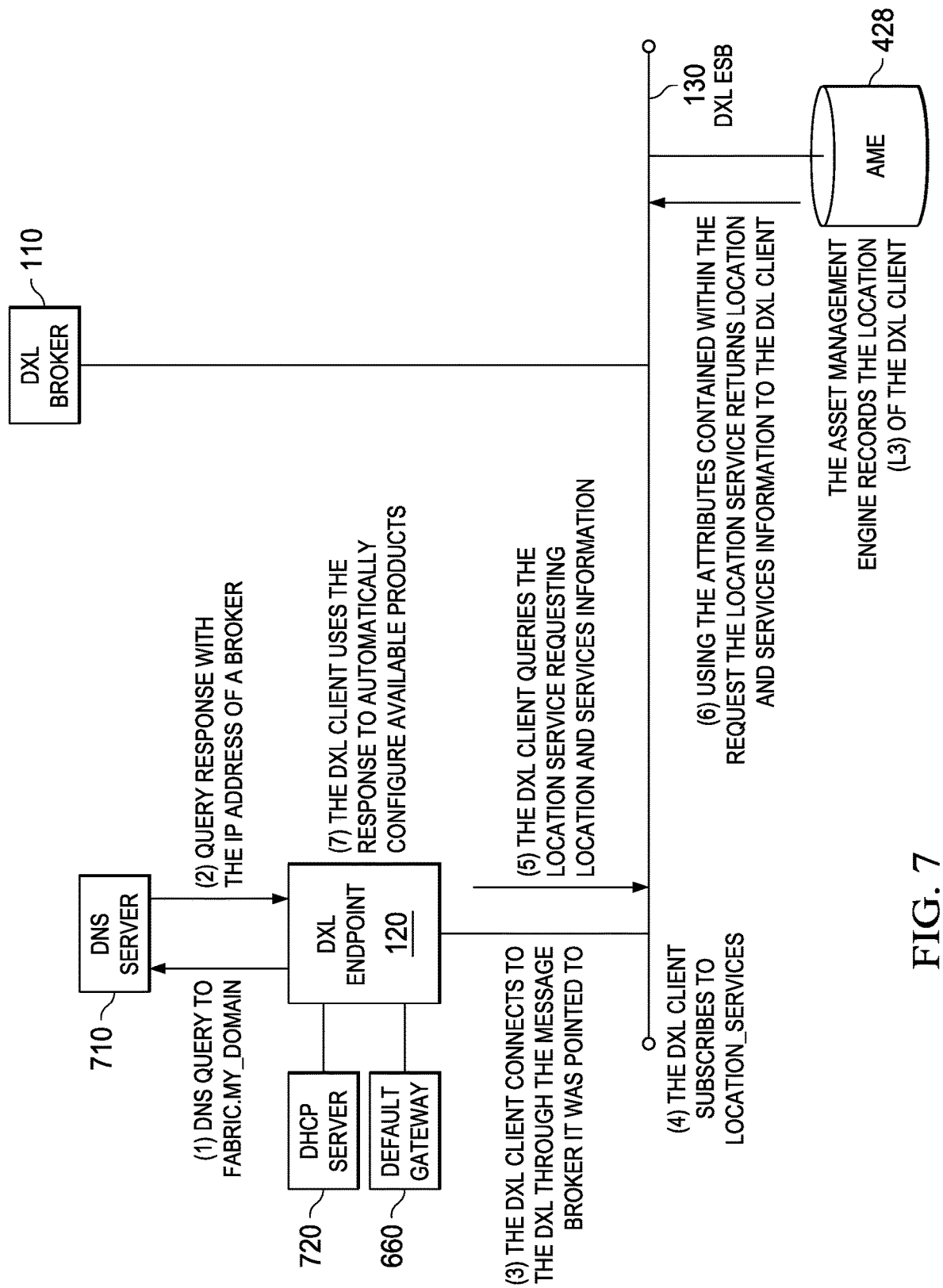
FIG. 7 is a block diagram of a method according to one or more examples of the present Specification.

FIG. 7 is a block diagram of a method of an asset management engine 428 providing location services for managed DXL clients 110.

Before any DXL operations take place, DXL endpoint 120 may join a network. For example, DXL endpoint 120 may boot up and communicate with DCHP server 720, which assigns to DXL endpoint 120 an IP address and a default gateway, such as default gateway 660. DHCP server 720 may also designate DNS server 710 as the proper source for DNS lookups.

In operation 1, DXL endpoint 120 queries DNS server 710 to try to resolve, for example, FABRIC.MY_DOMAIN (or any other unique domain name assigned).

In operation 2, DNS server 710 responds to the query with the IP address of one or more DXL brokers 110 that may be configured to service DXL endpoint 120.

In operation 3, DXL endpoint 120 uses the resolved IP address to try to connect to DXL ESB 130 via DXL broker 110. If DNS server 710 provided more than one DXL broker 110, DXL endpoint 120 may try to connect to each one in turn until it successfully makes a connection. DXL endpoint 710 is now joined to the fabric of DXL ESB 130.

In operation 4, after successfully connecting to DXL ESB 130, DXL endpoint 120 subscribes to a message topic such as LOCATION_SERVICES to gain access to location services provided by asset management engine 428. The topic of this message may be the private topic for the DXL endpoint 120.

In operation 5, DXL endpoint 120 initiates query-response communications with asset management engine 428 over the DXL. As part of the query, DXL endpoint 120 provides its MAC address, along with the MAC address of the router acting as its default gateway.

In operation 6, asset management engine 428 uses the MAC address of the default gateway router to identify the location or subnet work that DXL endpoint 120 belongs to. Asset management engine 428 then crafts a DXL response message directed specifically to be routed back to DXL endpoint 120. The body of the DXL message may include the current location of DXL endpoint 120, along with a list of services available at that location. Asset management engine 428 may also update its internal database to include location information for DXL endpoint 120.

Upon receiving the response message, DXL endpoint 120 may use the information to automatically configure available products and services including, but not limited to, the DXL broker it should be connected to.

In an alternative embodiment, DXL endpoint 120 may be configured by a management system, such as ePolicy Orchestrator, with the IP address of the DXL broker(s) it should be connecting to starting the process.

Figure 8:
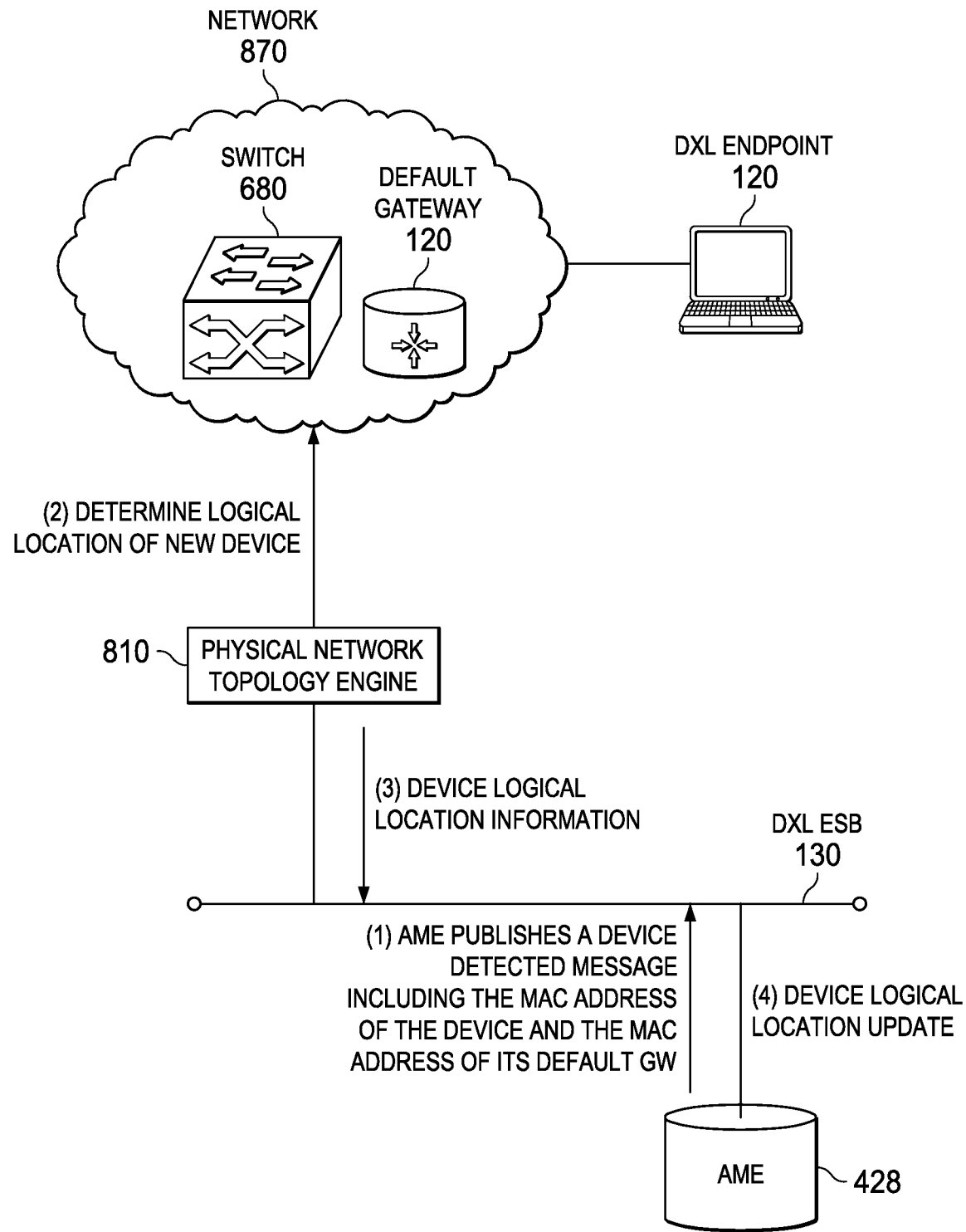
FIG. 8 is a block diagram of a method according to one or more examples of the present Specification.

FIG. 8 is a block diagram of a method of mapping a logical location according to one or more examples of the present Specification.

In the example of FIG. 7, DXL endpoint 120 learned only its location relative to its layer-3 connectivity (e.g., the router it is using as default gateway).

In the example of FIG. 8, a physical network topology engine 810 may also provide layer-2 connectivity data. In this case, DXL endpoint 120 is connected to a logical network 870, including a default gateway 120 and one or more switches 680.

In operation 1, asset management engine 428 detects a new device connected to the network (as discussed above), and publishes a DEVICE_DETECTED message, including the MAC address of the DXL endpoint 120 and the MAC address of the router acting as its default gateway. Asset management engine 428 may also build a list of switches that DXL endpoint 120 may be connected to.

In operation 2, using this information, physical network topology engine 810 queries each switch on the path to the router acting as the default gateway for DXL endpoint 120. This yields the switch IP address and port number that DXL endpoint 120 is connected to.

In operation 3, physical network topology engine 810 uses information from operation 2 to build the logical location of DXL endpoint 120.

In operation 4, physical network topology engine 810 publishes a DEVICE_LOGICAL_LOCATION_UPDATE message on DXL ESB 130.

In operation 4, asset management engine 428 consumes this message and updates its records.

Figure 9:
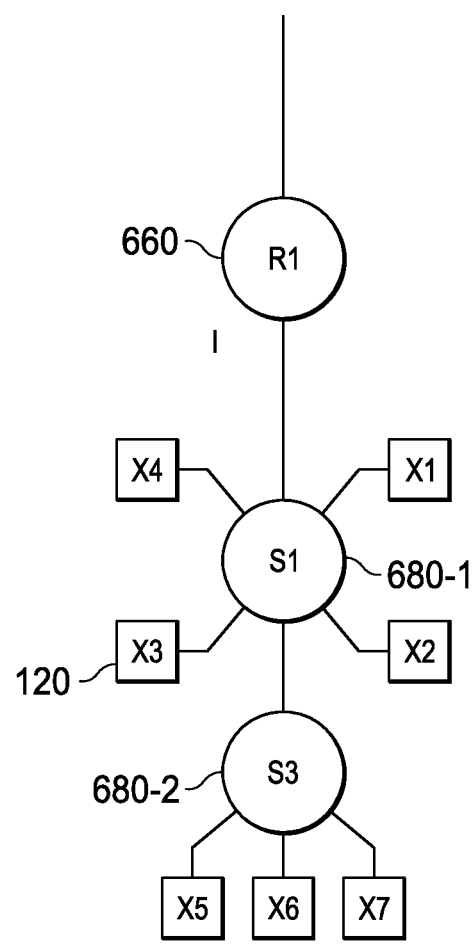
FIG. 9 is a block diagram of a method according to one or more examples of the present Specification.

A block diagram example of the derived path is seen in FIG. 9. Switches S3 and S1 are on the layer-3 path, which interface $R_{1i}$ of router $R_1$ serves. To find the location of DXL endpoint 120 using interface $R_{1i}$ as its default gateway, physical network topology engine 810 queries switches S3 and S1 for their knowledge of the MAC address of DXL endpoint 120, which in this case is endpoint $X_3$. Using the received answers, and having the physical network topology knowledge, physical network topology engine 810 deduces that DXL endpoint 120 is connected to switch $S_1$ via port $R_{1i}$. A method for accomplishing this is described in U.S. Pat. No. 8,811,224, which is incorporated herein by reference.

Figure 10:
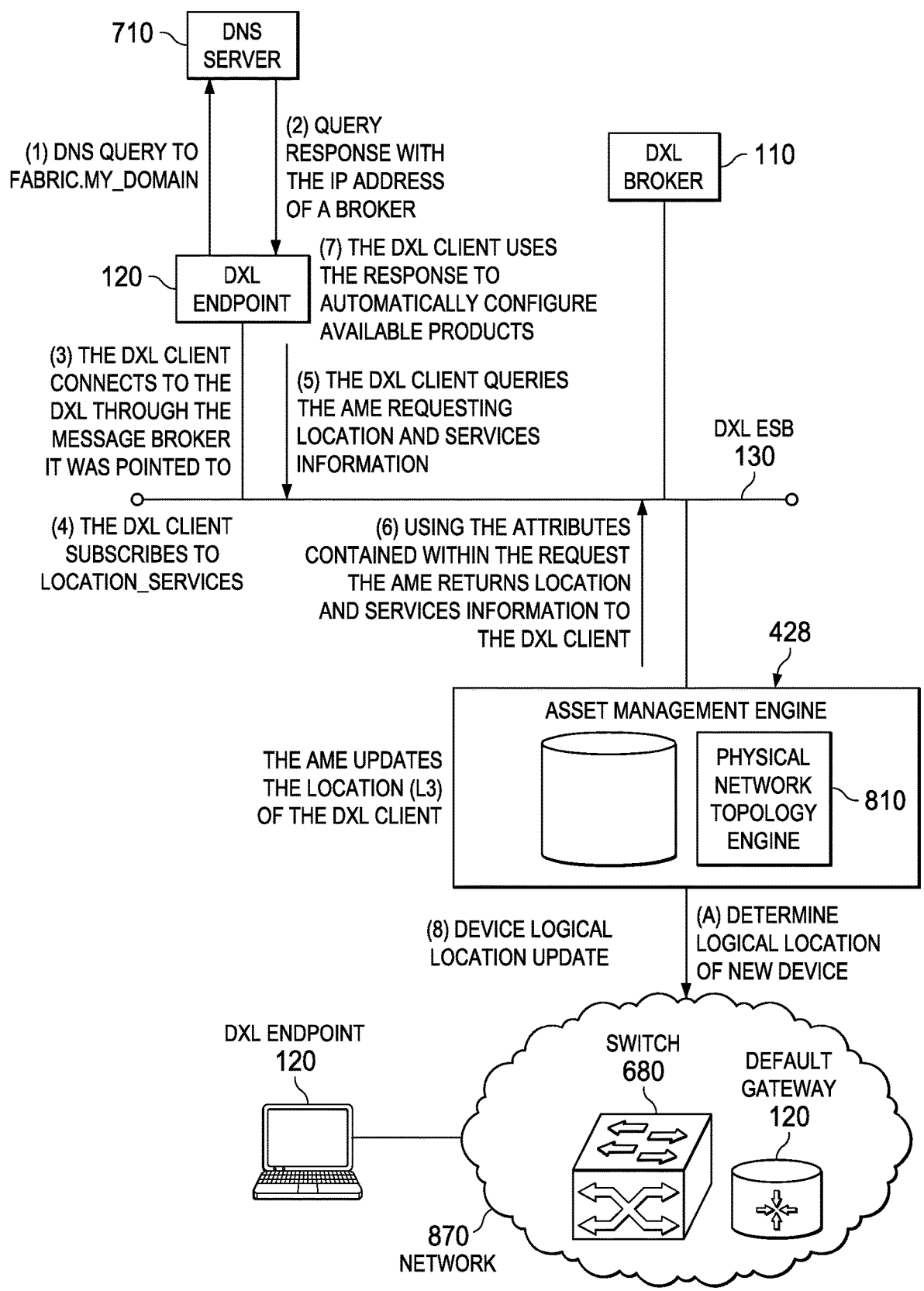
FIG. 10 is a block diagram of a method according to one or more examples of the present Specification.

FIG. 10 is a block diagram of a method of determining both logical location and physical location according to one or more examples of the present Specification.

In operation 1, DXL endpoint 120 performs a DNS lookup query to FABRIC.MY_DOMAIN, directed to DNS server 710.

In operation 2, DNS server 710 responds to the DNS query with the IP address of DXL broker 110, which is to operate as the DXL broker DXL endpoint 120 is to initially connect to.

In operation 3, DXL endpoint 120 connects to DXL ESB 130 via DXL broker 110.

In operation 4, DXL endpoint 120 subscribes to LOCATION_SERVICES messages.

In operation 5, DXL endpoint 120 queries asset management engine 428 and requests location and services information.

In operation 6, asset management engine 428 uses the attributes contained within the request of operation 5 to return location and services information to DXL endpoint 120.

In operation 7, DXL endpoint 120 uses the response to automatically configure available products.

In operation 8, physical network topology engine 810 of asset management engine 428 performs a device logical location update after determining, in operation 8(A), the logical location of DXL endpoint 120. This determination is according to the disclosure of FIG. 8.

Figure 11:
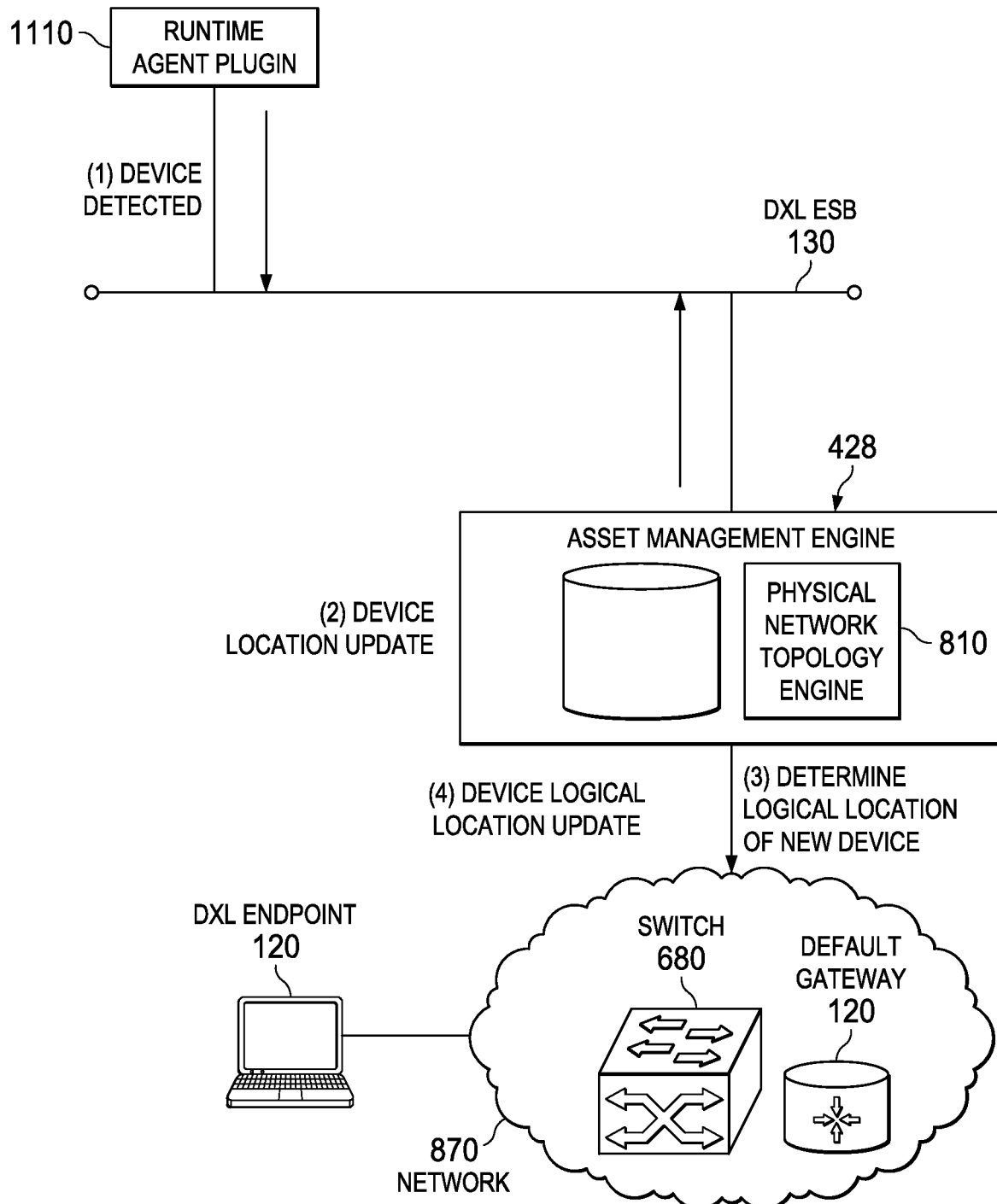
FIG. 11 is a block diagram of a method according to one or more examples of the present Specification.

FIG. 11 is a block diagram of a method of maintaining location information according to one or more examples of the present Specification. In the example of FIG. 11, a runtime agent plugin 1110 is provided.

In operation 1, runtime agent plugin 1110 publishes a DEVICE_DETECTED event when a new device is attached to DXL ESB 130 or to a subnet that runtime agent plugin 1110 is operating on. The message may include the MAC address and the IP address of the detected device, along with the MAC address of the router servicing this IP subnet.

This message is to be consumed by asset management engine 428. Thus, in operation 2, asset management engine 428 uses the MAC address of the gateway router and the IP subnet address to pinpoint the location on which the new device is operating and to create an association between the location and the device.

In operation 3, physical network topology engine 810 of asset management engine 428 determines the logical location of the new device according to the method disclosed in FIG. 8.

In operation 4, asset management engine 428 updates its internal database with the logical location of the new device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction-set computing)

machine (ARM), digital signal processor (DSP), field-programmable gate array (FPGA), graphics processing unit, programmable logic array, application-specific integrated circuit (ASIC), or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor QD00 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and non-volatile or slower memory that is used for storage. However, this split in memory is not necessary, and in some hardware platforms, a single memory structure is used. The hardware platform genus includes a wide range of devices, spanning from single-purpose embedded computers running on an application-specific integrated circuit (ASIC), or running on a special purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via network function virtualization (NFV), and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple VMs are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e., asymmetric cores), some form of translation, such as binary translation, may be utilized to schedule or execute code on one or both cores.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offers an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE IMPLEMENTATIONS

There is disclosed in one example a domain services controller apparatus for a data exchange layer (DXL), comprising: a network interface operable for communicatively coupling the apparatus to a DXL enterprise service bus (ESB); one or more logic elements comprising a DXL services engine operable to provide an application programming interface for communicating with DXL endpoints via the DXL ESB; and one or more logic elements comprising an asset management engine operable for: subscribing to a DXL location services topic; receiving a DXL location services query from a DXL endpoint via the DXL ESB; and providing network location data to the DXL endpoint via the DXL ESB.

There is further disclosed an example apparatus, wherein providing network location data comprises providing logical network location data.

There is further disclosed an example apparatus, wherein providing network location data comprises providing physical network location data.

There is further disclosed an example apparatus, wherein providing network location data comprises: receiving information about the DXL endpoint via a DXL query; determining a logical location of the DXL client based on the information about the DXL client; and publishing a DXL response comprising the logical location.

There is further disclosed an example apparatus, wherein a topic of the DXL response is a private destination topic of the DXL client.

There is further disclosed an example apparatus, wherein the asset management engine further comprises a physical network topology engine operable for mapping physical network locations.

There is further disclosed an example apparatus, wherein the asset management engine is further operable to interoperate with a physical network topology engine operable for mapping physical network locations.

There is further disclosed an example apparatus, wherein the asset management engine is further operable for: subscribing to a DXL device detected topic; receiving a DXL device detected message comprising an identifier for a detected device and an identifier for a broker for the detected device; building a list of switches to the detected device; and building a logical location of the detected device.

There is further disclosed an example apparatus, wherein the asset management engine is further operable for publishing the logical location of the detected device as a detected device DXL message.

There is further disclosed an example apparatus, wherein the asset management engine is operable for providing both logical and physical location services.

There is further disclosed an example apparatus, wherein the asset management engine is operable for receiving manual user input for updating the location services.

There is further disclosed an example apparatus, wherein the apparatus is further configured to act as a producer in a DXL producer-consumer architecture.

There is further disclosed an example apparatus, wherein the apparatus is further configured to act as a producer of DXL location services messages.

There is also disclosed an example of one or more computer-readable mediums having stored thereon instructions for instructing a processor for providing a data exchange layer (DXL) asset management engine operable for: subscribing to a DXL location services topic; receiving a DXL location services query from a DXL endpoint via a DXL enterprise service bus (ESB); and providing network location data to the DXL endpoint via the DXL ESB.

There is further disclosed an example of one or more computer-readable mediums, wherein providing network location data comprises providing logical network location data.

There is further disclosed an example of one or more computer-readable mediums, wherein providing network location data comprises providing physical network location data.

There is further disclosed an example of one or more computer-readable mediums, wherein providing network location data comprises: receiving information about the DXL endpoint via a DXL query; determining a logical location of the DXL client based on the information about the DXL client; and publishing a DXL response comprising the logical location.

There is further disclosed an example of one or more computer-readable mediums, wherein a topic of the DXL response is a private destination topic of the DXL client.

There is further disclosed an example of one or more computer-readable mediums, wherein the asset management engine further comprises a physical network topology engine operable for mapping physical network locations.

There is further disclosed an example of one or more computer-readable mediums, wherein the asset management engine is further operable to interoperate with a physical network topology engine operable for mapping physical network locations.

There is further disclosed an example of one or more computer-readable mediums, wherein the asset management engine is further operable for: subscribing to a DXL device detected topic; receiving a DXL device detected message comprising an identifier for a detected device and an identifier for a broker for the detected device; building a list of switches to the detected device; and building a logical location of the detected device.

There is further disclosed an example of one or more computer-readable mediums, wherein the asset management engine is further operable for publishing the logical location of the detected device as a detected device DXL message.

There is further disclosed an example of one or more computer-readable mediums, wherein the asset management engine is operable for receiving manual user input for updating the location services.

There is also disclosed an example computer-implemented method of providing location services on a data exchange layer (DXL) comprising: subscribing to a DXL location services topic; receiving a DXL location services query from a DXL endpoint via a DXL enterprise service bus (ESB); and providing network location data to the DXL endpoint via the DXL ESB.

There is further disclosed an example computer-implemented method, further comprising: subscribing to a DXL device detected topic; receiving a DXL device detected message comprising an identifier for a detected device and an identifier for a broker for the detected device; building a list of switches to the detected device; and building a logical location of the detected device.

There is further disclosed an example method, comprising performing the instructions disclosed in a number of the above examples.

There is further disclosed an example apparatus, comprising means for performing the method of a number of the above examples.

There is further disclosed an example apparatus, wherein the apparatus comprises a processor and memory.

There is further disclosed an example apparatus, wherein the apparatus further comprises a computer-readable medium having stored thereon software instructions for performing the method of a number of the above examples.

There is also disclosed in one example a computing apparatus, comprising: a hardware platform comprising a processor and a memory; a network interface to communicatively couple to an enterprise service bus (ESB); instructions encoded within the memory to provide a data exchange layer (DXL) application programming interface (API), the DXL API to provide communication with a plurality of other DXL endpoints via a DXL broker; and instructions encoded within the memory to provide an asset management engine to: subscribe to a DXL location services topic via the DXL broker; receive a DXL location services query from a DXL endpoint via the DXL broker; and publish network location data via the DXL broker.

There is further disclosed an example computing apparatus, wherein the network location data comprise logical network location data.

There is further disclosed an example computing apparatus, wherein the network location data comprise physical network location data.

There is further disclosed an example computing apparatus, wherein publishing network location data comprises: receiving information about the DXL endpoint via a DXL query; determining a logical location of the DXL endpoint based on the information about the DXL endpoint; and publishing a DXL response comprising the logical location.

There is further disclosed an example computing apparatus, wherein a topic of the DXL response is a private destination topic of the DXL endpoint.

There is further disclosed an example computing apparatus, further comprising a physical network topology engine operable for mapping physical network locations.

There is further disclosed an example computing apparatus, wherein the asset management engine further comprises instructions to interoperate with a physical network topology engine configured to map physical network locations.

There is further disclosed an example computing apparatus, wherein the asset management engine is further to: subscribe to a DXL device detected topic; receive a DXL device detected message comprising an identifier for a detected device and an identifier for a broker for the detected device; build a list of switches to the detected device; and build a logical location of the detected device.

There is further disclosed an example computing apparatus, wherein the asset management engine is further to publish the logical location of the detected device as a detected device DXL message.

There is further disclosed an example computing apparatus, wherein the asset management engine is further to provide both logical and physical location services.

There is further disclosed an example computing apparatus, wherein the asset management engine is further to receive manual user input for updating the location services.

There is further disclosed an example computing apparatus, wherein the DXL API is configured to act as a producer in a DXL producer-consumer architecture.

There is further disclosed an example computing apparatus, wherein the DXL API is configured to act as a producer of DXL location services messages.

There is also disclosed an example of one or more tangible, non-transitory computer-readable storage media having stored thereon executable instructions to: communicatively couple to a data exchange layer (DXL) broker; send a DXL message to the DXL broker to subscribe to a DXL location services topic; receive a DXL message comprising a location services query; and send to the DXL broker a DXL message comprising network location data.

There is further disclosed an example of one or more tangible, non-transitory computer-readable media, wherein the network location data comprise logical network location data.

There is further disclosed an example of one or more tangible, non-transitory computer-readable media, wherein the network location data comprise physical network location data.

There is further disclosed an example of one or more tangible, non-transitory computer-readable media, wherein the instructions are further to publish network location data, comprising: receiving information about a DXL endpoint via a DXL query; determining a logical location of the DXL endpoint based on the information about the DXL endpoint; and publishing a DXL response comprising the logical location.

There is further disclosed an example of one or more tangible, non-transitory computer-readable media, wherein a topic of the DXL response is a private destination topic of the DXL endpoint.

There is further disclosed an example of one or more tangible, non-transitory computer-readable media, wherein the instructions are further to instruct a physical network topology engine operable for mapping physical network locations.

There is further disclosed an example of one or more tangible, non-transitory computer-readable media, wherein the instructions are further to provide an asset management engine, further comprising instructions to interoperate with a physical network topology engine configured to map physical network locations.

There is further disclosed an example of one or more tangible, non-transitory computer-readable media, wherein the asset management engine is further to: subscribe to a DXL device detected topic; receive a DXL device detected message comprising an identifier for a detected device and an identifier for a broker for the detected device; build a list of switches to the detected device; and build a logical location of the detected device.

There is further disclosed an example of one or more tangible, non-transitory computer-readable media, wherein the asset management engine is further to publish the logical location of the detected device as a detected device DXL message.

There is further disclosed an example of one or more tangible, non-transitory computer-readable media, wherein the asset management engine is further to provide both logical and physical location services.

There is further disclosed an example of one or more tangible, non-transitory computer-readable media, wherein the asset management engine is further to receive manual user input for updating the location services.

There is further disclosed an example of one or more tangible, non-transitory computer-readable media, wherein the instructions are further to provide a DXL application programming interface (API) configured to act as a producer in a DXL producer-consumer architecture.

There is further disclosed an example of one or more tangible, non-transitory computer-readable media, wherein the DXL API is configured to act as a producer of DXL location services messages.

There is also disclosed an example computer-implemented method of providing data exchange layer (DXL) location services, comprising: registering with a DXL broker; subscribing to a DXL location services topic via the DXL broker; receiving from the DXL broker a location services query; and sending to the DXL broker a DXL message comprising network location data.

There is further disclosed an example method, wherein the network location data comprise logical network location data.

There is further disclosed an example method, wherein the network location data comprise physical network location data.

There is further disclosed an example method, further comprising publishing network location data, comprising: receiving information about a DXL endpoint via a DXL query; determining a logical location of the DXL endpoint based on the information about the DXL endpoint; and publishing a DXL response comprising the logical location.

There is further disclosed an example method, wherein a topic of the DXL response is a private destination topic of the DXL endpoint.

There is further disclosed an example method, further comprising communicatively connecting with a physical network topology engine operable for mapping physical network locations.

There is further disclosed an example method, further comprising communicatively connecting with an asset management engine, comprising interoperating with a physical network topology engine configured to map physical network locations.

There is further disclosed an example method, wherein the asset management engine is further to: subscribe to a DXL device detected topic; receive a DXL device detected message comprising an identifier for a detected device and an identifier for a broker for the detected device; build a list of switches to the detected device; and build a logical location of the detected device.

There is further disclosed an example method, wherein the asset management engine is further to publish the logical location of the detected device as a detected device DXL message.

There is further disclosed an example method, wherein the asset management engine is further to provide both logical and physical location services.

There is further disclosed an example method, wherein the asset management engine is further to receive manual user input for updating the location services.

There is further disclosed an example method, further comprising communicatively connecting with a DXL application programming interface (API) configured to act as a producer in a DXL producer-consumer architecture.

There is further disclosed an example method, wherein the DXL API is configured to act as a producer of DXL location services messages.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer readable medium comprising instructions that, when executed, implement a method or realize an apparatus as illustrated in an number of the above examples.

There is also disclosed an example computing apparatus, comprising: a hardware platform comprising a processor and a memory; and instructions encoded within the memory to instruct the processor to: provide a data exchange layer (DXL) software interface, the DXL software interface to communicatively couple to an enterprise service bus (ESB) and to provide DXL messaging services via the ESB; communicatively couple to a DXL broker via the DXL software interface; via the DXL broker, subscribe to a DXL location services topic; receive via the DXL broker a location services query; and responsive the location services query, provide logical location data for one or more network devices.

There is further disclosed an example computing apparatus, wherein providing logical location data comprises reporting a geographic network scope.

There is further disclosed an example computing apparatus, wherein providing logical location data comprises reporting geographic locations and network locations according to a plurality of zones.

There is further disclosed an example computing apparatus, wherein providing logical location data comprises ensuring that a network location operation is complete.

There is further disclosed an example computing apparatus, wherein providing logical location data comprises reporting a network location or locations that a security appliance does not protect.

There is further disclosed an example computing apparatus, wherein providing logical location data comprises providing a location-dependent product configuration.

There is further disclosed an example computing apparatus, wherein providing logical location data comprises resolving a conflict of IP addresses.

There is further disclosed an example computing apparatus, wherein providing logical location data comprises providing network-based services according to geographical location.

There is further disclosed an example computing apparatus, wherein providing logical location data comprises providing network-based services according to a logical location.

There is further disclosed an example computing apparatus, wherein providing logical location data comprises providing a framework for products operating in a shared geographic location to form a collaboration.

There is also disclosed an example of one or more tangible, non-transitory computer-readable storage media having stored thereon executable instructions to: communicatively couple to an enterprise bus; communicatively couple to a broker device via the enterprise bus, wherein communicatively coupling to the broker device comprises self-reporting information about a local host, and subscribing to one or more brokered topics, including a location services topic; receiving via the location services topic a request for enterprise location services; and responsive to the request, providing a logical location service for an enterprise.

There is further disclosed an example of one or more tangible, non-transitory computer-readable storage media, wherein providing logical location data comprises reporting a geographic network scope.

There is further disclosed an example of one or more tangible, non-transitory computer-readable storage media, wherein providing logical location data comprises reporting geographic locations and network locations according to a plurality of zones.

There is further disclosed an example of one or more tangible, non-transitory computer-readable storage media, wherein providing logical location data comprises ensuring that a network location operation is complete.

There is further disclosed an example of one or more tangible, non-transitory computer-readable storage media, wherein providing logical location data comprises reporting a network location or locations that a security appliance does not protect.

There is further disclosed an example of one or more tangible, non-transitory computer-readable storage media, wherein providing logical location data comprises providing a location-dependent product configuration.

There is further disclosed an example of one or more tangible, non-transitory computer-readable storage media, wherein providing logical location data comprises resolving a conflict of IP addresses.

There is further disclosed an example of one or more tangible, non-transitory computer-readable storage media, wherein providing logical location data comprises providing network-based services according to geographical location.

There is further disclosed an example of one or more tangible, non-transitory computer-readable storage media, wherein providing logical location data comprises providing network-based services according to a logical location.

There is further disclosed an example of one or more tangible, non-transitory computer-readable storage media, wherein providing logical location data comprises providing a framework for products operating in a shared geographic location to form a collaboration.

There is also disclosed an example computer-implemented method, comprising: establishing a brokered connection to an enterprise service bus (ESB), wherein the brokered connection comprises communicating with remote hosts via the ESB layered on top of a traditional transmission control protocol/internet protocol (TCP/IP) stack to enable communication via topics without reference to addresses of the remote hosts; subscribing, via the brokered connection, to a location services topic; receiving, via the brokered connection, a location services request having a header correlating the location services request to the location services topic; and responsive to the location services request, providing for an enterprise a logical location service.

There is further disclosed an example method, wherein providing logical location data comprises reporting a geographic network scope.

There is further disclosed an example method, wherein providing logical location data comprises reporting geographic locations and network locations according to a plurality of zones.

There is further disclosed an example method, wherein providing logical location data comprises ensuring that a network location operation is complete.

There is further disclosed an example method, wherein providing logical location data comprises reporting a network location or locations that a security appliance does not protect.

There is further disclosed an example method, wherein providing logical location data comprises providing a location-dependent product configuration.

There is further disclosed an example method, wherein providing logical location data comprises resolving a conflict of IP addresses.

There is further disclosed an example method, wherein providing logical location data comprises providing network-based services according to geographical location.

There is further disclosed an example method, wherein providing logical location data comprises providing network-based services according to a logical location.

There is further disclosed an example method, wherein providing logical location data comprises providing a framework for products operating in a shared geographic location to form a collaboration.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer readable medium comprising instructions that, when executed, implement a method or realize an apparatus as illustrated in a number of the above examples.

What is claimed is:

1. A computing apparatus, comprising:
    a hardware platform comprising a processor and a memory; and
    instructions encoded within the memory to instruct the processor to:
        provide a data exchange layer (DXL) software interface, the DXL software interface to communicatively couple to an enterprise service bus (ESB) and to provide DXL messaging services via the ESB;
        communicatively couple to a DXL broker via the DXL software interface;
        via the DXL broker, subscribe to a DXL location services topic;
        receive via the DXL broker a location services query; and
        responsive the location services query, provide logical location data for one or more network devices.

2. The computing apparatus of claim 1, wherein providing logical location data comprises reporting a geographic network scope.

3. The computing apparatus of claim 1, wherein providing logical location data comprises reporting geographic locations and network locations according to a plurality of zones.

4. The computing apparatus of claim 1, wherein providing logical location data comprises ensuring that a network location operation is complete.

5. The computing apparatus of claim 1, wherein providing logical location data comprises reporting a network location or locations that a security appliance does not protect.

6. The computing apparatus of claim 1, wherein providing logical location data comprises providing a location-dependent product configuration.

7. The computing apparatus of claim 1, wherein providing logical location data comprises resolving a conflict of IP addresses.

8. The computing apparatus of claim 1, wherein providing logical location data comprises providing network-based services according to geographical location.

9. The computing apparatus of claim 1, wherein providing logical location data comprises providing network-based services according to a logical location.

10. The computing apparatus of claim 1, wherein providing logical location data comprises providing a framework for products operating in a shared geographic location to form a collaboration.

11. One or more tangible, non-transitory computer-readable storage media having stored thereon executable instructions to:
communicatively couple to an enterprise bus;
communicatively couple to a broker device via the enterprise bus, wherein communicatively coupling to the broker device comprises self-reporting information about a local host, and subscribing to one or more brokered topics, including a location services topic;
receiving via the location services topic a request for enterprise location services; and
responsive to the request, providing a logical location service for an enterprise.

12. The one or more tangible, non-transitory computer-readable storage media of claim 11, wherein providing logical location data comprises reporting a geographic network scope.

13. The one or more tangible, non-transitory computer-readable storage media of claim 11, wherein providing logical location data comprises reporting geographic locations and network locations according to a plurality of zones.

14. The one or more tangible, non-transitory computer-readable storage media of claim 11, wherein providing logical location data comprises ensuring that a network location operation is complete.

15. The one or more tangible, non-transitory computer-readable storage media of claim 11, wherein providing logical location data comprises reporting a network location or locations that a security appliance does not protect.

16. The one or more tangible, non-transitory computer-readable storage media of claim 11, wherein providing logical location data comprises providing a location-dependent product configuration.

17. The one or more tangible, non-transitory computer-readable storage media of claim 11, wherein providing logical location data comprises resolving a conflict of IP addresses.

18. The one or more tangible, non-transitory computer-readable storage media of claim 11, wherein providing logical location data comprises providing a framework for products operating in a shared geographic location to form a collaboration.

19. A computer-implemented method, comprising:
establishing a brokered connection to an enterprise service bus (ESB), wherein the brokered connection comprises communicating with remote hosts via the ESB layered on top of a traditional transmission control protocol/internet protocol (TCP/IP) stack to enable communication via topics without reference to addresses of the remote hosts;
subscribing, via the brokered connection, to a location services topic;
receiving, via the brokered connection, a location services request having a header correlating the location services request to the location services topic; and
responsive to the location services request, providing for an enterprise a logical location service.

20. The method of claim 19, wherein providing logical location data comprises reporting a geographic network scope.

* * * * *